No. 805,487. PATENTED NOV. 28, 1905.
M. C. ROSENFELD.
PIPE COLLAR.
APPLICATION FILED JAN. 11, 1905.
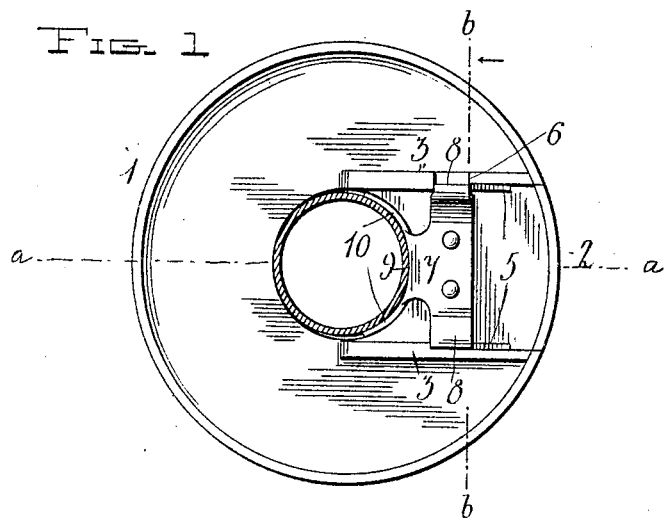
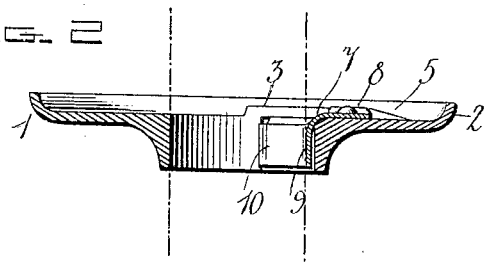
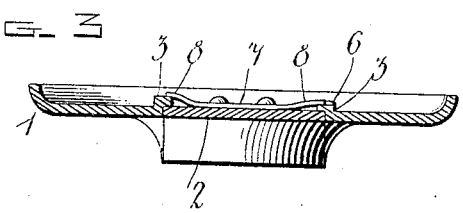
Witnesses
Inventor
Mortimer C. Rosenfeld
By Chas. R. Miller
His Attorney

UNITED STATES PATENT OFFICE.

MORTIMER C. ROSENFELD, OF CLEVELAND, OHIO.

PIPE-COLLAR.

No. 805,487. Specification of Letters Patent. Patented Nov. 28, 1905.

Application filed January 11, 1905. Serial No. 240,606.

*To all whom it may concern:*

Be it known that I, MORTIMER C. ROSENFELD, a citizen of the United States, residing at Cleveland, in the county of Cuyahoga and State of Ohio, have invented new and useful Improvements in Pipe-Collars, of which the following is a specification.

My invention is an improved pipe-collar adapted for use in connection with a steam, water, gas, or other pipe for giving the same a finished appearance where it enters a floor or ceiling; and it consists in the construction, combination, and arrangement of devices hereinafter described and claimed.

One object of my invention is to provide a collar of this description with a detachable section, which enables the collar to be placed on the pipe after the latter has been secured in place, a further object of my invention being to provide improved means for securing the detachable section of the collar in place and for also securing the collar to the pipe, so that the same will not slip on the pipe.

In the accompanying drawings, Figure 1 is a plan view of a collar embodying my improvements, showing the inner side thereof, also indicating the pipe on which the collar is placed. Fig. 2 is a sectional view of the same, taken on the plane indicated by the line *a a* of Fig. 1; and Fig. 3 is a similar view taken on the plane indicated by the line *b b* of Fig. 1.

My improved pipe-collar comprises a body portion 1, a detachable section 2, and a yoke 7, secured to said detachable section. The body portion 1, which may be of plate metal and stamped or otherwise economically produced, is provided with a radial parallel-sided opening in one side of the said body portion and with flanges 3 at the sides of said opening. Said flanges are beveled at their outer ends, as at 5, and one of said flanges is here shown as provided with a stop-notch 6. Both of them may have such notches, if preferred. The detachable section 2 is of such size and shape as to adapt it to fit in the radial opening in the body portion and to bear against the flanges 3. The yoke 7 is secured on the inner side of the detachable section, near the inner edge thereof, and is formed integrally with spring-arms 8 to bear on the flanges 3 and coact therewith to retain the detachable section in place. The beveled ends 5 of the flanges 3 enable the spring-arms 8 to readily engage the said flanges when the section is being inserted in the opening of the body portion, as will be understood. One of the spring-arms of the yoke engages the notch 6, and hence serves to lock the detachable section. Also formed integrally with the yoke is a portion 9, which is bent at right angles thereto and is formed with integral terminal spring-arms 10, which bear against one side of the pipe and yield as the section 2 is placed in and secured to the body portion 1. The tension of the said spring-arms against the pipe creates such friction as to secure the collar to the pipe and prevent the collar from slipping therein, hence rendering it unnecessary to otherwise secure the collar either to the pipe, the floor, the ceiling, or the wall.

Various changes in the form, proportion, and the minor details of construction may be resorted to without departing from the principle or sacrificing any of the advantages of this invention.

Having thus described my invention, what I claim as new, and desire to secure by Letters Patent, is—

1. A pipe-collar comprising a body portion having an opening in one side, a detachable section to fit and close said opening, and a yoke on said section, having devices to secure the section in place and also having a portion to bear frictionally against the pipe, to secure the collar thereto.

2. A pipe-collar comprising a body portion having an opening in one side and flanges at the sides of said opening, a detachable section to fit and close said opening and engage said flanges, and a yoke on said section having spring-arms to bear on said flanges and coact therewith to secure the detachable section in place, said yoke also having a portion to bear frictionally against the pipe.

3. A pipe-collar comprising a body portion having an opening in one side and flanges at the sides of said opening, one of said flanges having a notch, and a yoke on said section having spring-arms to bear on said flanges, one of said spring-arms being adapted to enter said notch, the said yoke being further provided with a portion to bear frictionally against the pipe.

In testimony whereof I have hereunto set my hand in the presence of two subscribing witnesses.

MORTIMER C. ROSENFELD.

Witnesses:
 WM. ROTHENBERG,
 LOUIS B. SPANNER.